United States Patent [19]

Bae

[11] Patent Number: 5,607,175
[45] Date of Patent: Mar. 4, 1997

[54] BOTTOM STRUCTURE OF A BAG

[76] Inventor: Sung H. Bae, 887-50 Kumdan-Dong Buk-Gu, Taegu, Rep. of Korea

[21] Appl. No.: 401,357

[22] Filed: Mar. 9, 1995

[30] Foreign Application Priority Data

Jul. 13, 1994 [KR] Rep. of Korea ............... 94-17524

[51] Int. Cl.$^6$ ........................................ B62B 1/12
[52] U.S. Cl. ............ 280/655; 280/47.19; 280/47.315; 206/315.91
[58] Field of Search ................. 280/47.19, 47.24, 280/47.315, 79.5, 79.6, 652, 654, 655, 655.1, 37, 47.26; 206/315.91

[56] References Cited

U.S. PATENT DOCUMENTS

| | | | |
|---|---|---|---|
| 3,998,476 | 12/1976 | Kazmark | 280/47.24 |
| 5,074,571 | 12/1991 | Reese | 280/47.19 |
| 5,199,811 | 4/1993 | Huang | 280/655 |
| 5,335,759 | 8/1994 | Yeh | 280/37 |
| 5,367,743 | 11/1994 | Chang | 280/47.315 |
| 5,368,143 | 11/1994 | Pond | 280/655.1 |
| 5,431,428 | 7/1995 | Marchwiak et al. | 280/655 |

Primary Examiner—Anne Marie Boehler
Attorney, Agent, or Firm—Richard T. Holzmann

[57] ABSTRACT

A bottom structure of a bag is disclosed. In the bottom structure, support rings are longitudinally arranged on the bottom thereof. Sleeve pipes fixedly fitted in the support rings such that the sleeve pipes longitudinally extend in parallel on the bottom of the bottom structure. A pair of bushings are fitted into the front wall of the bottom structure such that the bushings are aligned with the sleeve pipes. A pair of handle pipes are movably received in the bushings as well as in the sleeve pipes such that the handle pipes appear out of and disappear in the bushings as well as in the sleeve pipes. The rear end of each handle pipe has a stopper for preventing separation of the handle pipes from the bushings when fully extending the handle pipes out of the sleeve pipes. A plurality of rollers are mounted to the rear end of the bottom structure.

4 Claims, 3 Drawing Sheets

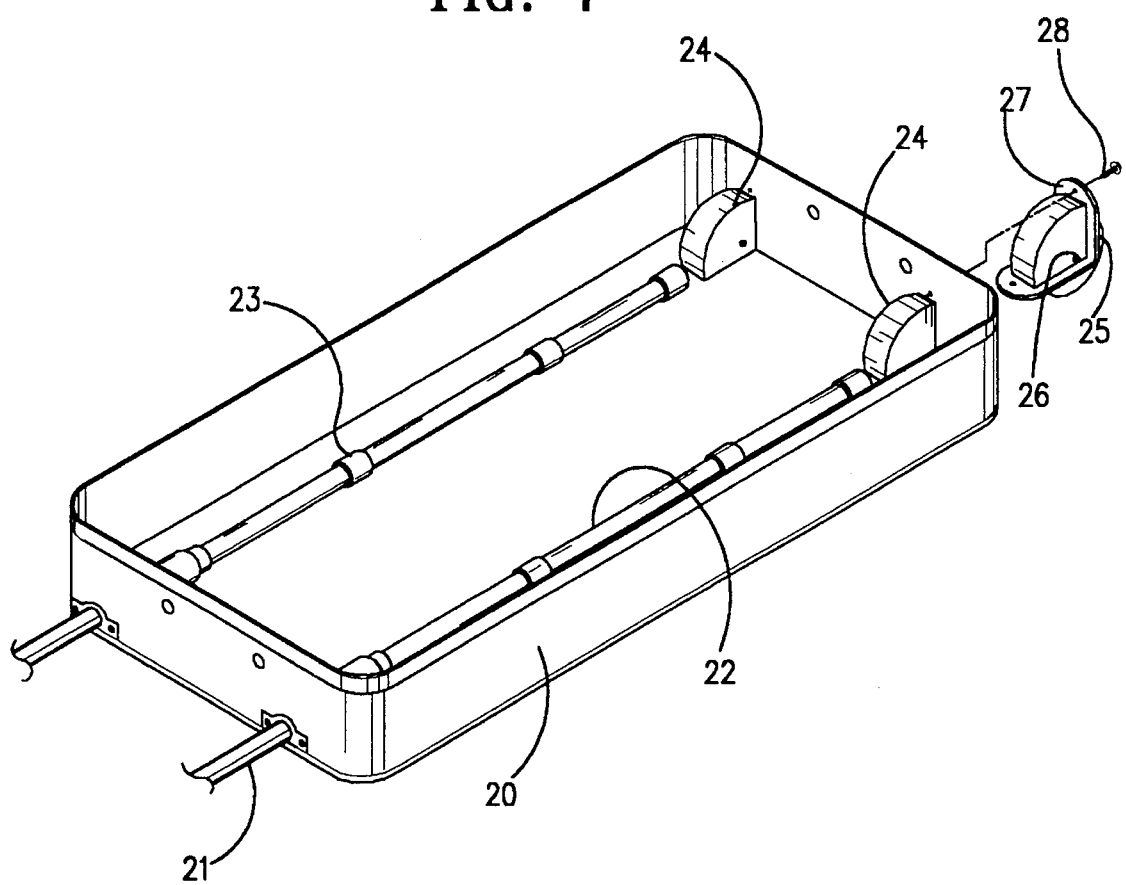

1

BOTTOM STRUCTURE OF A BAG

FIELD OF THE INVENTION

The present invention relates in general to a bottom structure of a bag or trunk and, more particularly, to a structural improvement of such a bottom structure.

BACKGROUND OF THE INVENTION

There are a variety of conventional bags whose bottoms are made of synthetic resins and have rollers on their outer bottoms. However, these bags suffer from the problem of not being able to withstand the weight of heavy loads and are apt to be easily broken.

SUMMARY OF THE INVENTION

It is, therefore, an object of the present invention to provide a bottom structure of a bag in which the above problem can be overcome and which is longitudinally provided with sleeve pipes for receiving extendible handle pipes therein, and rollers mounted on the rear end of the bottom structure, thus to facilitate production of the bag and to allow ease of use.

In order to accomplish the above object, a bottom structure of a bag in accordance with an embodiment of the present invention comprises: a plurality of support rings longitudinally arranged on the bottom of the bottom structure; a pair of sleeve pipes fixedly fitted in the support rings such that the sleeve pipes longitudinally extend in parallel on the bottom of the bottom structure; a pair of bushings having internal rings and fitted into the front wall of the bottom structure such that the bushings are aligned with the sleeve pipes and communicate with the sleeve pipes respectively; a pair of handle pipes movably received in the bushings as well as in the sleeve pipes such that the handle pipes appear out of and disappear in the bushings as well as in the sleeve pipes, the rear ends of the handle pipes having stoppers, the stoppers being stopped by the internal rings of the bushings preventing separation of the handle pipes from the bushings when fully extending the handle pipes out of the sleeve pipes; and a plurality of rollers mounted to the rear end of the bottom structure.

BRIEF DESCRIPTION OF THE DRAWINGS

The above and other objects, features and other advantages of the present invention will be more clearly understood from the following detailed description taken in conjunction with the accompanying drawings, in which:

FIG. 7 is an exploded perspective view of a bottom structure of a bag in accordance with a third embodiment of the present invention.

DESCRIPTION OF THE PREFERRED EMBODIMENTS

Figure 1:
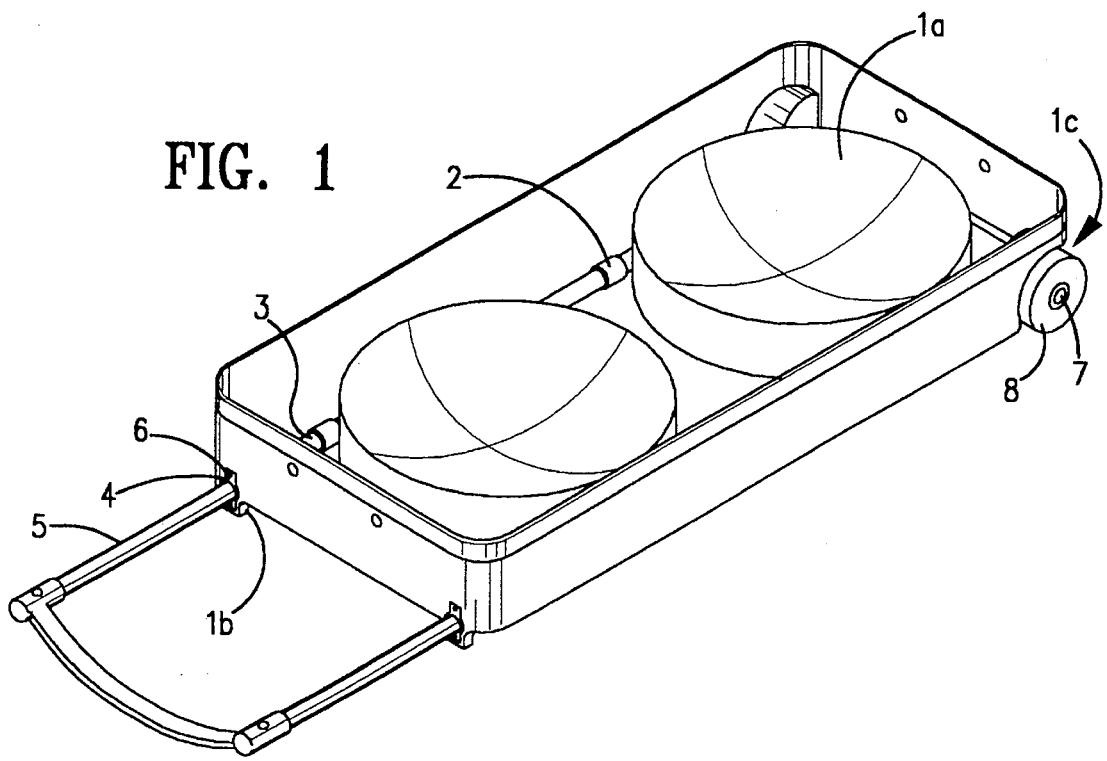
FIG. 1 is a perspective view of a bottom structure of a bag in accordance with a first embodiment of the present invention.
Figure 2:
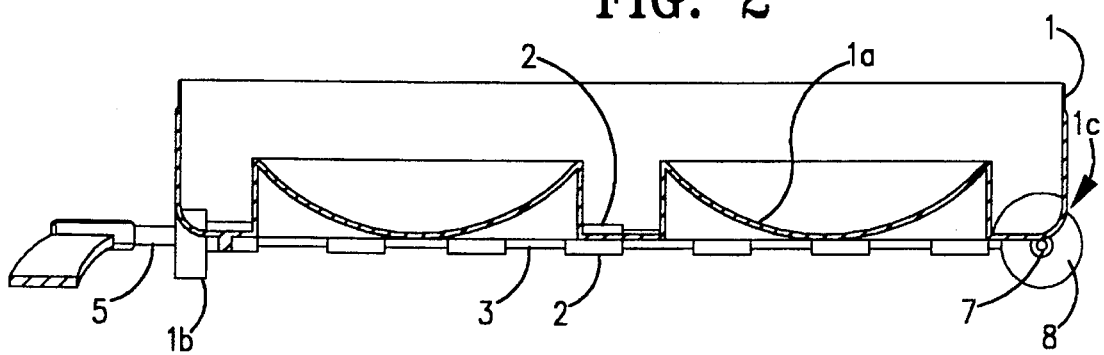
FIG. 2 is a longitudinal sectional view of the bottom structure of FIG. 1.

FIG. 1 is a perspective view of a bottom structure 1 of a bag in accordance with a first embodiment of the present invention. FIG. 2 is a sectional view of the bottom structure 1, and FIG. 3 is a sectional view of the bottom structure 1 provided with extendible handle pipes.

Figure 3:
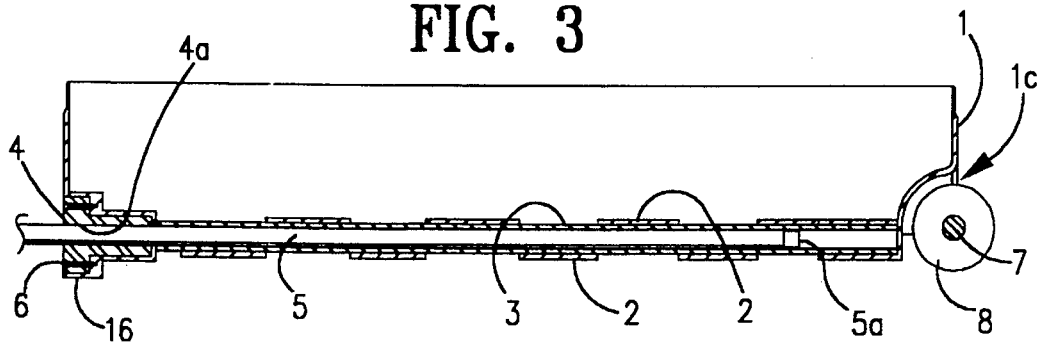
FIG. 3 is a longitudinal sectional view of the bottom structure of FIG. 1 provided with extendible handle pipes.

As shown in the drawings, box-shaped bottom structure 1 having bowling ball seats 1a on its interior bottom is provided with a plurality of support rings 2, which rings 2 are arranged in the longitudinal opposed side corners such that support rings 2 are exposed to the inside as well as to the outside of bottom structure 1 as best seen in FIG. 3. A pair of sleeve pipes 3 are fixedly fitted in support rings 2 so that sleeve pipes 3 longitudinally extend in parallel in the opposed side corners of bottom structure 1. The opposed front corners of bottom structure 1 are provided with downward projections 1b respectively, while the opposed rear corners of bottom structure 1 are provided with roller recesses 1c. A bushing 4 having an internal ring 4a is fitted into the front wall of bottom structure 1 at each of the opposed front corners of bottom structure 1. Bushing 4 is fixed to the front wall of bottom structure 1 by screwing bushing 4 to the front wall using set screws 6. At this time, bushings 4 are aligned with sleeve pipe 3 so that bushings 4 communicate with sleeve pipes 3 respectively. A handle pipe 5 is movably received in each bushing 4 and in each sleeve pipe 3 such that handle pipe 5 appears out of and disappears in bushing 4 as well as in sleeve pipe 3. The rear end of each handle pipe 5 is provided with a stopper 5a, which stopper 5a has an outer diameter larger than the inner diameter of internal ring 4a of bushing 4 so that stopper 5a is stopped by internal ring 4a and prevents separation of handle pipe 5 from bushing 4 when fully extending handle pipe 5 out of sleeve pipe 3. A roller shaft 7 transversely extends in the rear section of bottom structure 1 so that shaft 7 penetrates the centers of roller recesses 1c of bottom structure 1. A pair of rollers 8 are fitted over the opposed ends of shaft 7.

Figure 4:
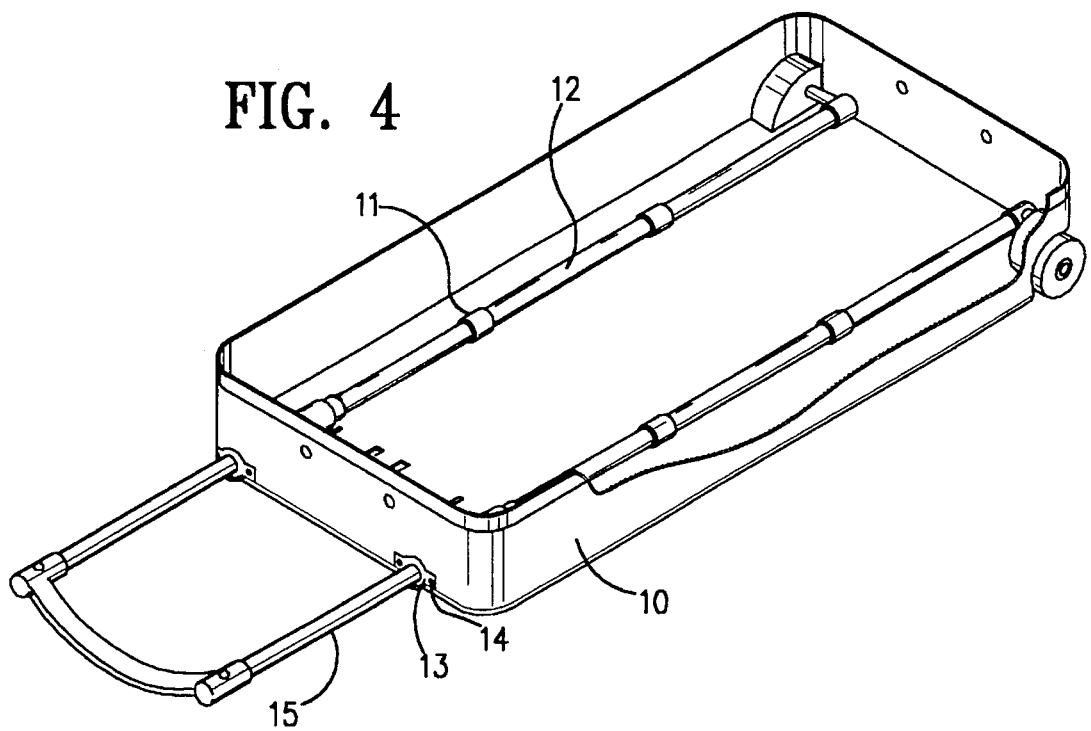
FIG. 4 is a perspective view of a bottom structure of a bag in accordance with a second embodiment of the present invention.
Figure 5:
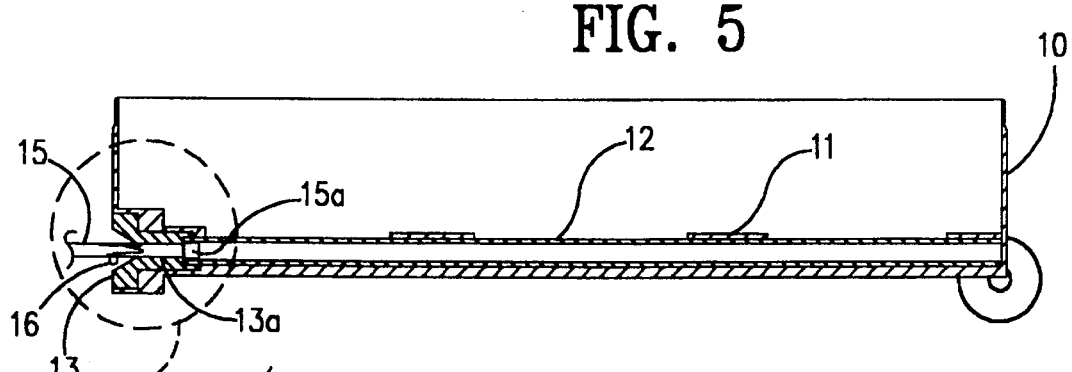
FIG. 5 is a longitudinal sectional view of the bottom structure of FIG. 4 provided with handle pipes.
Figure 6:
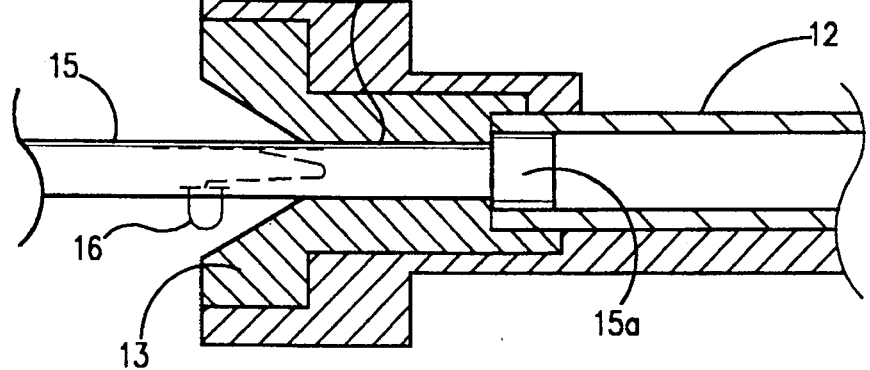
FIG. 6 is an enlarged sectional view of the bottom structure of FIG. 5, showing a rear end section of one of the handle pipes stopped by a bushing.

Turning to FIGS. 4 to 6, there is shown a bottom structure of a bag in accordance with a second embodiment of the invention. In bottom structure 10 of the second embodiment, a plurality of support rings 11 are mounted to the interior bottom of bottom structure 10 such that support rings 11 are exposed to the inside of bottom structure 10 and placed in two rows parallel to each other. A pair of sleeve pipes 12 are fixedly fitted in support rings 11 so that sleeve pipes 12 longitudinally extend in parallel in bottom structure 10. The opposed front corners of bottom structure 10 are provided with bushings 13, while the opposed rear corners of bottom structure 10 are provided with rollers. Each of the bushings 13 having an internal ring 13a is fitted into the front wall of bottom structure 10 at each of the opposed front corners of bottom structure 10. At this time, bushing 13 is fixed to the front wall of bottom structure 10 by screwing bushing 13 to the front wall using set screws 14 such that bushing 13 is aligned with an associated sleeve pipe 12. A handle pipe 15 is movably received in each bushing 13 and in each sleeve pipe 12 such that handle pipe 15 appears out of and disappears in bushing 13 as well as in sleeve pipe 12. The rear end of each handle pipe 15 is provided with a stopper 15a for prevention of separation of handle pipe 15 from bushing 13 when fully extending handle pipes 15 out of sleeve pipes 12. The rear section of each handle pipe 15 is provided with a stop protrusion 16 for retaining the extended state of handle pipe 15.

FIG. 7 is an exploded perspective view of a bottom structure of a bag in accordance with a third embodiment of the present invention. In bottom structure 20 in the third embodiment, a plurality of support rings 23 are mounted on the interior bottom of bottom structure 20 such that support rings 23 are exposed to the inside of bottom structure 20 and arranged in two rows parallel to each other in the same manner as described for the second embodiment. A pair of sleeve pipes 22 are fixedly fitted in support rings 23 and movably receives therein handle pipes 21. The rear end section of bottom structure 20 is provided with roller recesses 24 such that roller recesses 24 are placed in the lines of sleeve pipes 22. A roller supporter 27 having a roller 25, which roller 25 is rotatably fixed to support 27 by pin 26, is mounted to an associated roller recess 24 of bottom structure 20 by rivets 28.

The operational effect of the above bottom structures of the invention will be described hereinbelow.

Bottom structure 1 of the first embodiment is integrated with a bag body made of, for example, woven fabric, or natural or synthetic leather, into a bowling bag by placing the lower end of the bag body about an attaching part of bottom structure 1 and sewing, for example, the bag body together with the attaching part of the bottom structure. In the above bowling bag, bottom structure 1 is provided with sleeve pipes 3 which pipes longitudinally extend in bottom structure 1 and movably receive handle pipes 5 therein. Structure 1 also includes rollers 8 fitted over the opposed ends of shaft 7, which shaft penetrates the centers of the roller recesses 1c of bottom structure 1. When using the above bowling bag, handle pipes 5 extend out of sleeve pipes 3 after seating the bowling balls on the bowling ball seats of structure 1. The bowling bag in this state is lifted up such that only rollers 8 come into contact with the ground so as to roll on the ground. At this time, the bowling bag is handled while gripping the handle grip extending between the front ends of handle pipes 5 extended out of sleeve pipes 3.

Bottom structure 1 of the above bowling bag is produced through a molding process so that structure 1 is not deformed or broken even when a heavy load is applied to structure 1.

When fully extending handle pipes 5 out of sleeve pipes 3, stoppers 5a of the rear ends of the handle pipes 5 are received in bushings 4 and stopped by internal rings 4a of bushings 4 respectively, so that there is little or no play in handle pipes 5 in sleeve pipes 3 when using the bowling bag with fully extended handle pipes 5.

Bottom structure 10 of the second embodiment is integrated with a bag body made of, for example, woven fabric, or natural or synthetic leather, into a bag by placing the lower end of the bag body about the side wall of bottom structure 10 and by attaching the bag body to the side wall of bottom structure 10.

In the above bag, bottom structure 10 is provided with sleeve pipes 12, which pipes 12 longitudinally extend in bottom structure 10 for movably receiving handle pipes 5 therein. Structure 10 also includes rollers in the rear end so that structure 10 can be conveniently used in the same manner as described for the first embodiment.

In bottom structure 10 of the second embodiment, the sleeve pipes 12 extend on the interior bottom of structure 10 such that pipes 12 are exposed to the inside of structure 10. Therefore, structure 10 has a good outer appearance.

When fully extending handle pipes 15 out of sleeve pipes 12, stoppers 15a of the rear ends of handle pipes 15 are stopped by internal rings 13a of bushings 13 and, at the same time, the extended state of handle pipes 15 are retained by stop protrusions 16. Therefore, there is little or no play in handle pipes 15 in sleeve pipes 12 when using the bag with the fully extended handle pipes 15.

The bag having bottom structure 10 of the second embodiment has no bowling ball seat thus being different from the bag having bottom structure 1 of the first embodiment so that the bag of the second embodiment can be preferrably used as a trunk.

In bottom structure 20 of the third embodiment, the rollers are not exposed to the corners of structure 20 so that structure 20 has a good outer appearance. This bottom structure 20 also has especially good shock resistance.

As described above, the bottom structure according to the first embodiment of the invention has a plurality of bowling ball seats therein and is provided with extendible handle pipes, which handle pipes can appear and disappear with respect to the sleeve pipes longitudinally extending in the bottom structure. The bowling bag having the bottom structure of the first embodiment can be easily produced and easily moved when using the bag.

The bottom structure according to the second embodiment of the invention has no bowling ball seat but has the extendible handle pipes, which handle pipes can appear and disappear with respect to the sleeve pipes. The bag having the bottom structure of the second embodiment can be easily produced and easily moved when using the bag. The bottom structure of the second embodiment has roller supporters having rollers rotatably fixed to the supporters by pins are mounted to roller recesses of the bottom structure by rivets. Therefore, the rollers are not exposed to the corners of the bottom structure so that this bottom structure has a good outer appearance.

The bottom structures of the invention integrated with bag bodies made of, for example, woven fabric, or natural or synthetic leather, into bags by placing the lower ends of the bag bodies about the side walls of the bottom structures and by attaching the bag bodies to the side walls of the bottom structures.

Therefore, the present invention provides the bottom structure of a bag, which bottom structure facilitates production of the bags. The bags with the bottom structures of the invention can be easily used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bottom structure of a bag comprising:
   a bag having a plurality of support rings longitudinally arranged on a bottom of the bottom structure;
   a pair of sleeve pipes fixedly fitted in the support rings wherein the sleeve pipes longitudinally extend in parallel on the bottom of the bottom structure;
   a pair of bushings having internal rings and fitted into a front wall of the bottom structure constructed and arranged so that the bushings are aligned with said sleeve pipes and communicate with the sleeve pipes respectively;
   a pair of handle pipes movably received in the bushings as well as in said sleeve pipes wherein the handle pipes appear out of and disappear in the bushings as well as in said sleeve pipes, the rear ends of said handle pipes having stoppers, said stoppers being stopped by the internal rings of the bushings and preventing separation of the handle pipes from the bushings when fully extending the handle pipes out of said sleeve pipes; and a plurality of rollers mounted to a rear end of the bottom structure.

2. The bottom structure according to claim 1, further comprising bowling ball seats on its interior bottom, and the support rings are mounted to the longitudinal opposed side corners constructed and arranged such that the support rings are exposed to the inside as well as to the outside of the bottom structure.

3. The bottom structure according to claim 1, wherein the support rings are mounted to the interior bottom of the bottom structure constructed and arranged so that the support rings are exposed to the inside of the bottom structure, and the rear sections of each of the handle pipes is provided with a stop protrusion for retaining the extended state of each handle pipe.

4. The bottom structure according to claim 1, wherein the rear end of the bottom structure is provided with roller recesses constructed and arranged such that the roller recesses are aligned with said sleeve pipes respectively, and roller supporters are mounted to said roller recesses respectively by rivets, and said rollers are rotatably fixed to said roller supporters by pins.

* * * * *